United States Patent
Sun et al.

(10) Patent No.: US 10,785,693 B2
(45) Date of Patent: Sep. 22, 2020

(54) CONNECTION MANAGEMENT METHOD AND APPARATUS, AND COMPUTER STORAGE MEDIUM

(71) Applicants: CHINA MOBILE COMMUNICATION CO., LTD RESEARCH INSTITUTE, Beijing (CN); CHINA MOBILE COMMUNICATIONS CORPORATION, Beijing (CN)

(72) Inventors: Tao Sun, Beijing (CN); Dan Wang, Beijing (CN); Hui Cai, Beijing (CN)

(73) Assignees: CHINA MOBILE COMMUNCATION CO., LTD RESEARCH INSTITUTE, Beijing (CN); CHINA MOBILE COMMUNCATIONS CORPORATION, Beijing (CN)

(*) Notice: Subject to any disclaimer, the term of this patent is extended or adjusted under 35 U.S.C. 154(b) by 0 days.

(21) Appl. No.: 16/340,107

(22) PCT Filed: Oct. 11, 2017

(86) PCT No.: PCT/CN2017/105778
§ 371 (c)(1),
(2) Date: Apr. 6, 2019

(87) PCT Pub. No.: WO2018/068738
PCT Pub. Date: Apr. 19, 2018

(65) Prior Publication Data
US 2020/0053614 A1 Feb. 13, 2020

(30) Foreign Application Priority Data
Oct. 11, 2016 (CN) .......................... 2016 1 0889291

(51) Int. Cl.
*H04W 36/12* (2009.01)
*H04W 36/32* (2009.01)

(52) U.S. Cl.
CPC ........... *H04W 36/12* (2013.01); *H04W 36/32* (2013.01)

(58) Field of Classification Search
CPC ..... H04W 36/12; H04W 36/32; H04W 76/20; H04W 88/16; H04W 36/00; H04W 4/02
See application file for complete search history.

(56) References Cited

U.S. PATENT DOCUMENTS 8,023,469 B2 * 9/2011 Sachs ................ H04W 36/0016
370/331
8,948,137 B2 2/2015 Sachs
(Continued)

FOREIGN PATENT DOCUMENTS

CN 1798364 A 7/2006
CN 101150838 A 3/2008
(Continued)

OTHER PUBLICATIONS

Supplementary European Search Report in European application No. 17859735.7, dated Jun. 12, 2019.
(Continued)

*Primary Examiner* — Hashim S Bhatti
(74) *Attorney, Agent, or Firm* — Syncoda LLC; Feng Ma

(57) ABSTRACT

A connection management method includes: detecting relevant information about a terminal device; and based on the relevant information about the terminal device, determining whether to adjust the type of a connection path between the terminal device and a first forwarding plane, wherein the type of the connection path between the terminal device and the first forwarding plane at least includes: a first-type path being a connection path directly established, through an
(Continued)

access network, between the terminal device and the first forwarding plane, and a second-type path being a connection path established, through the access network via a second forwarding plane, between the terminal device and the first forwarding plane.

18 Claims, 14 Drawing Sheets

(56) References Cited

U.S. PATENT DOCUMENTS

| | | |
|---|---|---|
| 2009/0131053 A1 | 5/2009 | Sachs |
| 2010/0177686 A1 | 7/2010 | Abeille |
| 2011/0235546 A1 | 9/2011 | Horn |
| 2011/0292914 A1 | 12/2011 | Sachs |

FOREIGN PATENT DOCUMENTS

| | | |
|---|---|---|
| CN | 101167392 A | 4/2008 |
| CN | 101772106 A | 7/2010 |
| CN | 102238634 A | 11/2011 |
| CN | 102469619 A | 5/2012 |
| CN | 102480782 A | 5/2012 |
| CN | 103139847 A | 6/2013 |
| WO | 2011038352 A1 | 3/2011 |

OTHER PUBLICATIONS

Nokia et al: "Local-Breakout-to support-Ultra-Low Latency Communications", 3GPP Draft; R3-162314 Local Breakout, 3rd Generation Partnership Project (3GPP), Mobile Competence Centre ; 650, Route Des Lucioles ; F-06921 Sophia-Antipolis Cedex ; France, vol. RAN WG3, no. Sophia Antipolis, France; Oct. 10, 2016-Oct. 14, 2016 Oct. 6, 2016 (Oct. 6, 2016), XP051151965,Retrieved from the Internet: URL: http://www.3gpp.org/ftp/Meetings_3GPP_SYNC/RAN3/Docs/ [ retrieved on Oct. 6, 2016 ]* Chapters 2.1, 2.2 * * figures 6.4.13.1-3, 1, 2 *.

"3rd Generation Partnership Project; Technical Specification Group Services and System Aspects; Study on Architecture for Next Generation System (Release 14)", 3GPP Standard; 3GPP TR 23.799, 3rd Generation Partnership Project (3GPP), Mobile Competence Centre ; 650, Route Des Lucioles ; F-06921 Sophia-Antipolis Cedex ; France, vol. SA WG2 , No. V1.0.2, Sep. 30, 2016 (Sep. 30, 2016), pp. 1-423, XP051172701, [ retrieved on Sep. 30, 2016 ] * chapters 6.4.13, 6.4.14 *.

International Search Report in international application No. PCT/CN 2017/105778, dated Jan. 8, 2018.

English Translation of the Written Opinion of the International Search Authority in international application No. PCT/CN 2017/105778, dated Jan. 8, 2018.

Jianmin Zhang et al. "Mobile edge computing and application in traffic offloading"; Telecom Science; Jul. 20, 2016.

* cited by examiner

CONNECTION MANAGEMENT METHOD AND APPARATUS, AND COMPUTER STORAGE MEDIUM

CROSS-REFERENCE TO RELATED APPLICATION

The present application claims benefit of Chinese Patent Application No. 201610889291.3, filed on Oct. 11, 2016, the contents of which are hereby incorporated by reference in its entirety.

TECHNICAL FIELD

The disclosure relates to a connection management technology in the field of communications, and particularly to a connection management method and device and a computer storage medium.

BACKGROUND

In a mobile network architecture, network elements (or network functions) of a core network consists of functions of two parts: a control plane and a user plane. In a conventional network architecture, for example, a 3rd-Generation (3G)/4th-Generation (4G) network, a user-plane gateway is usually deployed in a centralized manner in a core layer relatively far away from a user. In a mobile network, for meeting low-delay and large-bandwidth scenarios, a user-plane function is submerged and deployed on an edge of the network during optimization of a 4G network architecture or design of a novel 5G network architecture, so as to reduce a transmission delay and reduce transmission pressure of backhaul network.

In a conventional art, there are two existing solutions for implementing edge service shunting: a multi-session (connection) solution and a single-session (or connection) solution. However, the two connection solutions either require a terminal device to maintain excessive configuration information to main multiple session connections or increase network processing complexity and delay for access to data of a core-side Public Data Network (PDN). As can be seen, a network architecture for edge service shunting in the conventional art may not be flexibly adjusted and reduction in configuration processing of a terminal device side may not be ensured.

SUMMARY

The disclosure is directed to a connection management method and device and a computer storage medium, so as to solve the foregoing problems in the conventional art.

In order to achieve the purpose, embodiments of the disclosure provide a connection management method, which may include the following operations.

Relevant information of a terminal device is detected.

Whether to adjust a type of a connection path between the terminal device and a first forwarding plane is determined based on the relevant information of the terminal device.

The connection path between the terminal device and the first forwarding plane may at least include: a first-type path which is a connection path directly established with the first forwarding plane by the terminal device through an Access Network (AN); and a second-type path which is a connection path established with the first forwarding path by the terminal device through the AN via a second forwarding plane.

Embodiments of the disclosure provide a connection management device, which may include an information acquisition unit and a path adjustment unit.

The information acquisition unit may detect relevant information of a terminal device.

The path adjustment unit may determine whether to adjust a type of a connection path between the terminal device and a first forwarding plane based on the relevant information of the terminal device.

The connection path between the terminal device and the first forwarding plane may at least include: a first-type path which is a connection path directly established with the first forwarding plane by the terminal device through an AN; and a second-type path which is a connection path established with the first forwarding path by the terminal device through the AN via a second forwarding plane.

Embodiment of the disclosure provide a connection management device, which includes a communication interface and a processor.

The communication interface detects relevant information of a terminal device.

The processor determines whether to adjust a type of a connection path between the terminal device and a first forwarding plane based on the relevant information of the terminal device.

The connection path between the terminal device and the first forwarding plane may at least include: a first-type path which is a connection path directly established with the first forwarding plane by the terminal device through an AN; and a second-type path which is a connection path established with the first forwarding path by the terminal device through the AN via a second forwarding plane.

Embodiments of the disclosure provide a connection management device, which includes a processor and a memory configured to store a computer program capable of running on the processor.

Herein, the processor is configured to run the computer program to execute the operations of the abovementioned method.

Embodiments of the disclosure provide a computer storage medium, which may store a computer-executable instruction, the computer-executable instruction being executed to implement the operations of the abovementioned method.

According to the connection management method and device and computer storage medium disclosed in embodiments of the disclosure, whether to adjust the type of the path between the terminal device and the first forwarding plane may be determined at least based on an Access Network (AN) corresponding to a location where the terminal device has moved to. Specifically, the type of the path may include the first-type path for direct connection to the first forwarding path and the second-type path for connection to the first forwarding path through the second forwarding path. Therefore, flexibility and high efficiency of a network architecture may be achieved, gateway processing is implemented with a smallest number of hops in case of no local shunting, and edge network data may be accessed only by configuring of the type of the path on a network side without relatively more configuration changes made on a terminal device side.

DETAILED DESCRIPTION

The disclosure will further be described below in combination with the drawings and specific embodiments in detail.

First Embodiment

The embodiment of the disclosure provides a connection management method, which is applied to a connection management device and includes the following operations. Relevant information of a terminal device is detected.

Whether to adjust a type of a connection path between the terminal device and a first forwarding plane is determined based on the relevant information of the terminal device.

The connection path between the terminal device and the first forwarding plane may at least include: a first-type path which is a connection path directly established with the first forwarding plane by the terminal device through an Access Network (AN); and a second-type path which is a connection path established with the first forwarding path by the terminal device through the AN via a second forwarding plane.

Herein, the relevant information of the terminal device includes at least one of a location of the terminal device or a present type of service of the terminal device.

Figure 1:
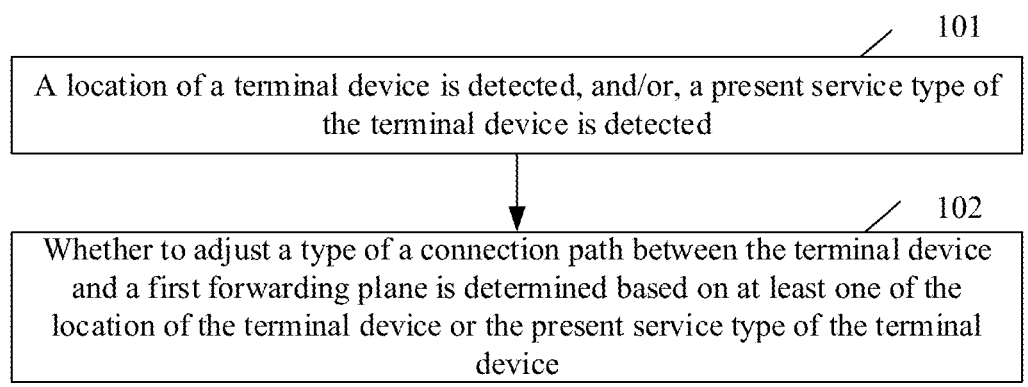
FIG. 1 is a first flowchart of a connection management method according to an embodiment of the disclosure.

Specifically, as shown in FIG. 1, the method includes the following operations 101 to 102.

In 101, a location of a terminal device is detected, and/or, a present type of service of the terminal device is detected.

In 102, whether to adjust a type of a connection path between the terminal device and a first forwarding plane is determined based on at least one of the location of the terminal device or the present type of service of the terminal device.

The connection path between the terminal device and the first forwarding plane may at least include: a first-type path which is a connection path directly established with the first forwarding plane by the terminal device through an AN; and a second-type path which is a connection path established with the first forwarding path by the terminal device through the AN via a second forwarding plane.

Herein, the connection management device is mainly arranged in a core network and may specifically be implemented in a manner that a module is arranged in a certain device in the core network and, for example, may be arranged in a Mobility Management Entity (MME) in the core network. The first forwarding plane is a core user plane and a second forwarding plane is an edge user plane.

Furthermore, the location of the terminal device is detected, and/or, the present type of service of the terminal device is detected. That is, acquisition of the location of the terminal device may be acquisition of a location where the terminal device has presently moved to, i.e., a present location of the terminal device. A specific manner may include the following operations: a target access device presently to be accessed by the terminal device is detected, and identification information of the target access device (for example, an Identity (ID) of the access device) is acquired; an area corresponding to the access device is determined based on the identification information of the target access device (for example, a core network side may determine an area code corresponding to the access device through the identification information of the access device); and the present location of the terminal device is determined based on the area corresponding to the access device.

Herein, the access device may be a device, which may be a base station or may also be an Access Point (AP) and the like, configured to provide a direct access manner for the terminal device.

Specifically, there are two triggering conditions in the solution. The first triggering condition refers to determining whether the terminal device is located in an AN capable of implementing local service shunting based on a change of the location of the terminal device, thereby determining whether to adjust the type of the path of the terminal device. In addition, the second triggering condition refers to determining whether to adjust the type of the path of the terminal device in combination with whether the terminal device has a local service shunting or service transmission path optimization requirement.

The embodiment is mainly for the first triggering condition. User Equipment (UE) only establishes a session connection oriented to a Core Gateway (CGW) as a default during session connection. When the UE moves into coverage of a gateway capable of supporting local shunting, a control plane initiates establishment of a new tunnel, thereby adding the Edge Gateway (EGW) into an existing session, that is, the first-type path is handed over to the second-type path. When the UE moves out of the coverage of the EGW (the AN does not include the EGW), the control plane may trigger a new tunnel establishment mechanism to delete the EGW from the session path, establish the second-type path and delete the first-type path.

A first scenario: before the operation that the location of the terminal device is acquired, the method further includes the following operation.

The terminal device establishes the first-type path with the first forwarding plane through a first access device, the first access device being different from the target access device required to be accessed by the terminal device at the present location and coverage corresponding to the first access device not including the second forwarding plane or being unsuitable for access to the second forwarding plane.

Correspondingly, the operation that whether to adjust the type of the connection path between the terminal device and the first forwarding plane is determined at least based on the AN corresponding to the location of the terminal device includes the following operation.

When a location where the terminal device is currently located enables the second forwarding plane (i.e., an edge-side user plane) to be accessed or a second forwarding plane suitable for the terminal device to be accessed, the path between the terminal device and the first forwarding plane is determined to be adjusted from the first-type path to the second-type path. That is, the core network side may determine, according to the present location (for example, the area code) of the terminal device, whether there is an edge-side user plane (second forwarding plane) capable of optimizing a local service access path at the location.

Figure 2:
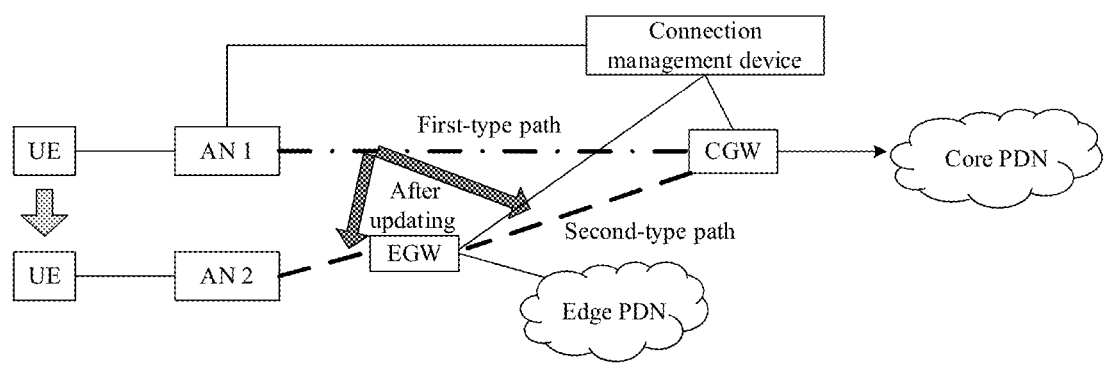
FIG. 2 is a first schematic diagram of a processing scenario according to an embodiment of the disclosure.

A processing scenario of the embodiment may refer to FIG. 2. The terminal device, for example, the UE, moves between an AN 1 and an AN 2, the AN 1 corresponding to the first access device and the AN 2 being correspondingly an AN corresponding to the target access device required to be accessed by the UE. Correspondingly, when the UE is located in the AN 1, the connection management device determines that the UE presently adopts the first-type path, that is, as shown in the figure, the first forwarding plane (for example, a CGW in the figure) is accessed through the AN 1, and a core network (which may specifically be a core PDN) finally performs data processing. In addition, when the UE moves to the AN 2, i.e., the network where the target access device required to be accessed is located, the network side, which may specifically be the connection management device, hands over the type of the path between the UE and the core network to the second-type path, i.e., a connection established with the CGW through the second forwarding plane (for example, the EGW), part of a service required to be locally shunted may be shunted into an edge PDN through the second-type path, and the other part of the service required to be processed by the core PDN is transmitted to the core PDN through the CGW for processing.

Figure 3:
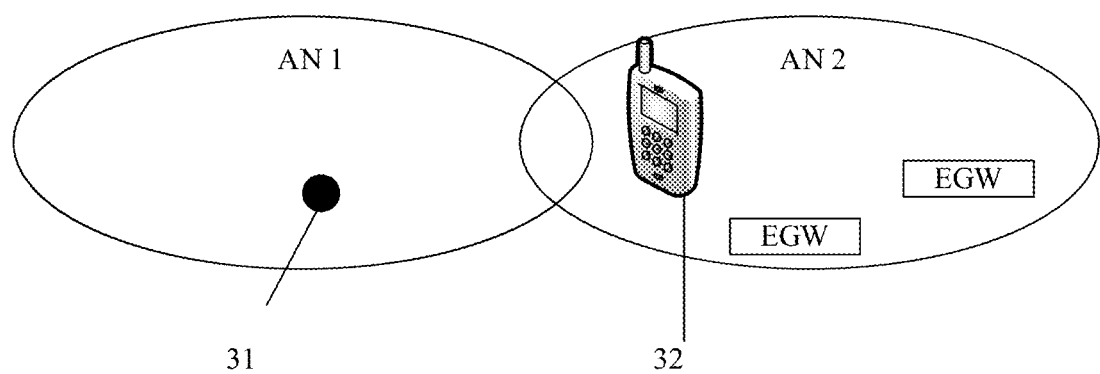
FIG. 3 is a second schematic diagram of a processing scenario according to an embodiment of the disclosure.

The first access device is different from the target access device required to be accessed by the terminal device at the present location. Specifically, referring to FIG. 3, a first location 31 of the terminal device may be a location within the coverage of the AN 1, i.e., the first access device, the terminal device moves to the present location 32 (it is to be understood that the terminal device, after moving, may still be located in the AN 1 and may also be located in the AN 2, and descriptions are made in the embodiment mainly for a scenario that the AN changes, i.e., the scenario shown in FIG. 3), and the location 32 is in the AN 2, i.e., the network where the target access device required to be accessed by the terminal device. Furthermore, the AN 1 does not include or is unsuitable for access to the second forwarding plane (for example, the EGW in the figure), that is, the AN 1 may not provide local service shunting. The AN 2 includes the second forwarding plane (for example, the EGW in the figure) capable of optimizing the local service access path, that is, the AN 2 may provide local service shunting. Then, the type of the connection established by the terminal device and the core network may be adjusted based on different ANs where the terminal device is located.

Figure 4A:
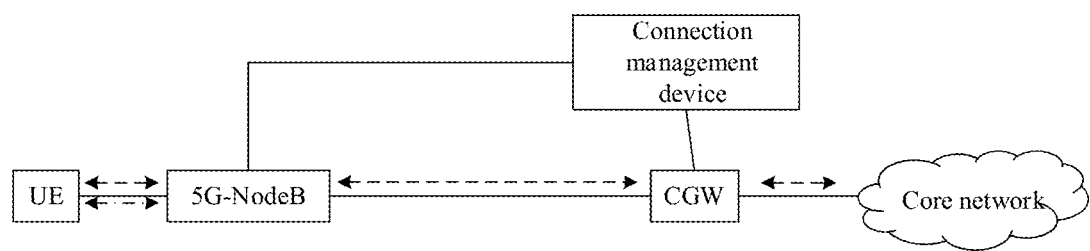
FIG. 4a is a schematic diagram of a first-type path according to an embodiment of the disclosure.

It is to be understood that, in the scenario, when the terminal device initially accesses the network, the connection management device may determine a type of a path initially established by the terminal device based on whether the AN where the terminal device is located includes the second forwarding plane (for example, the edge-side user plane or the EGW). When the AN does not include or is unsuitable for access to the second forwarding plane, the terminal device establishes the first-type path when initially accessing the network and, as shown in FIG. 4a, directly establishes a connection with the CGW. When the AN includes the EGW, the terminal device establishes the second-type path shown in FIG. 4b when initially accessing the network, and establishes the connection with the CGW through the EGW. Specifically, the local network is accessed through the EGW for service shunting, and part of the service is routed to the CGW for data processing through the core network, for example, a data network.

After the terminal device, for example, the UE, moves to a new location, the control plane (i.e., the connection management device) acquires a present location of the AN and determines whether the second forwarding plane presently exists. If the second forwarding plane exists, the control plane acquires information of the second forwarding plane (for example, an Internet Protocol (IP) address thereof) through an ID of the present AN (for example, an ID of an access base station or information of a location area, for example, a Tracking Area (TA)).

If it is determined that the path between the terminal device and the first forwarding plane is required to be adjusted from the first-type path to the second-type path, the corresponding second forwarding plane is selected for the terminal device, the identification information of the second forwarding plane is sent to the first forwarding plane as information of a downlink tunnel of the first forwarding plane and the identification information of the second forwarding plane is sent to the AN side as information of an uplink tunnel of an access side, so as to establish the second-type path between the terminal device and the first forwarding plane through the access device (the AN corresponding to the target access device required to be accessed at the present location) via the second forwarding plane.

That is, after the first-type path is determined to be adjusted to the second-type path, it is also necessary to notify the terminal device to adjust the type of the path and notify the second forwarding plane to be accessed by the terminal device.

Specifically, if the terminal device moves in a connected state, the second forwarding plane, for example, the EGW, may be determined as opposite ends of tunnels of the base station and the CGW in a handover message, which may include the following operations.

An IP address and tunnel ID of a downlink tunnel of the EGW are notified to the CGW as an endpoint of a downlink tunnel of the CGW; and an IP address and tunnel ID of an uplink tunnel of the EGW are notified to the AN as an endpoint of an uplink tunnel of the AN.

If the terminal device moves from a non-Mobile Edge Computing (MEC) area to an MEC area in an idle mode and when the UE actively initiates a service or the UE is triggered to initiate session establishment after network paging responsive to arrival of downlink data, the network determines whether to update the connection according to the present location. If the connection is required to be updated, the control plane does not establish a new tunnel between the CGW and the AN but establishes a tunnel among the AN, the EGW and the CGW.

A second scenario: a difference from the first scenario is that adjustment of the first-type path to the second-type path is introduced in the first scenario and adjustment of the second-type path to the first-type path is described in the scenario.

The terminal device establishes the second-type path with the first forwarding plane through a second access device, the second access device being different from the target access device required to be accessed by the terminal device at the present location and there being the second forwarding plane or the second forwarding plane suitable for the terminal device to access at a present location of the second access device.

When there is no second forwarding plane or no second forwarding plane suitable for the terminal device to access at a location where the terminal device is currently located, the path between the terminal device and the first forwarding plane is determined to be adjusted from the second-type path to the first-type path.

Figure 5:
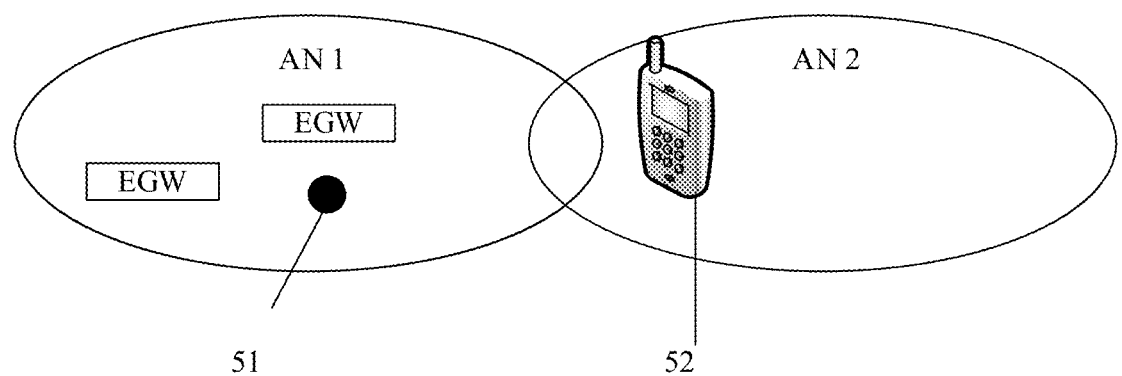
FIG. 5 is a second schematic diagram of a processing scenario according to an embodiment of the disclosure.

The second access device is different from the target access device required to be accessed by the terminal device at the present location. Specifically, referring to FIG. 5, a first location 51 of the terminal device may be a location within the AN 1 of the second access device, the terminal device moves to the present location 52 (it is to be understood that the terminal device, after moving, may still be located in the AN 1 and may also be located in the AN 2, and descriptions are made in the embodiment mainly for the scenario that the AN changes, i.e., the scenario shown in the figure), and the location 52 is in the AN 2, and the AN 2 corresponds to the target access device required to be accessed by the terminal device. Furthermore, the AN 1 includes the second forwarding plane (for example, the EGW in the figure), that is, the AN 1 may provide local service shunting. The AN 2 does not include or is unsuitable for access to the second forwarding plane (for example, the EGW in the figure), that is, the AN 2 may not provide local service shunting. Then, the second-type path of the terminal device is required to be adjusted to the first-type path based on different ANs where the terminal device is located.

If it is determined that the path between the terminal device and the first forwarding plane is required to be adjust from the second-type path to the first-type path, the identification information corresponding to the AN is notified to the first forwarding plane and the identification information of the first forwarding plane is notified to the AN, so as to establish the first-type path between the terminal device and the first forwarding plane.

After the terminal device moves to a new location, if the control plane determines through the present location of the AN that the second forwarding plane is not required any more in a present session, information of the middle EGW is not included in connection updating, and a data channel of the user plane changes into a direct connection of the AN and the CGW.

Specifically, in the connected state, the AN and the CGW are directly determined as mutual tunnel opposite ends in a handover message from the MEC area to the non-MEC area: a corresponding tunnel ID and IP of the AN are notified to the CGW as an endpoint of a downlink tunnel of the CGW; and an IP address and tunnel ID of the tunnel of the CGW are notified to the AN as an endpoint of an uplink tunnel of the AN.

If the UE moves to the non-MEC area in the idle state, the network performs location updating to further release a user-plane tunnel between the EGW and the CGW, and a new tunnel is a direct one-hop tunnel of the AN and the CGW next time when the UE turns from idle to active.

A third scenario: a difference from the second scenario is that a judgment manner for handover back to the first-type path is provided in the scenario: when the terminal device is at a location where no connection is established with the original forwarding plane, the path is handed over back to the first-type path.

Before the operation that the present position of the terminal device is acquired, the method further includes the following operation.

The terminal device establishes the second-type path with the first forwarding plane through the second access device via the second forwarding plane, the second access device being different from the target access device required to be accessed by the terminal device at the present location.

Correspondingly, the operation that whether to adjust the type of the connection path between the terminal device and the first forwarding plane is determined based on at least one of the present location of the terminal device or the present type of service of the terminal device includes the following operation.

When a location where the terminal device is currently located does not enable the second forwarding plane to be accessed, the path between the terminal device and the first forwarding plane is determined to be adjusted from the second-type path to the first-type path.

Whether the second forwarding plane is enabled to be accessed may be determined based on a physical location, stored on the core network side, corresponding to each second forwarding plane. When the coverage corresponding to the present location of the terminal device, for example, the area code, does not include the second forwarding plane, it may be determined that the second-type path may not be kept any more at present and then may be adjusted to the first-type path.

Furthermore, the target access device required to be accessed by the terminal device at the present location may be determined in a manner that, in a handover process of the terminal device, a handover request which may be sent to the network side by the terminal device for handing over to multiple access devices which may be accessed is acquired through a handover flow and the target access device may finally be selected for the terminal device, i.e., the target access device required to be accessed by the terminal device at the present location in the embodiment. Examples of adjusting the type of the path based on the location of the terminal device and the AN in the embodiment will be described below in combination with the drawings respectively.

First Example

Figure 6:
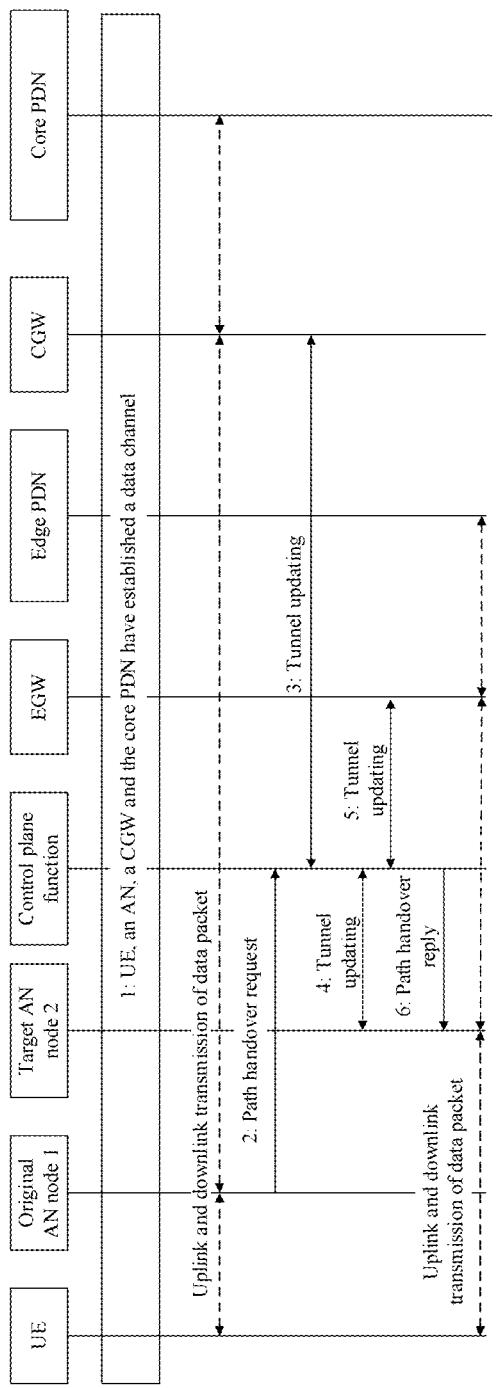
FIG. 6 is a second flowchart of a connection management method according to an embodiment of the disclosure.

When UE moves and a second forwarding plane (for example, an EGW in the figure) is dynamically added, a flow, as shown in FIG. 6, includes the following operations 1 to 6.

In 1, the UE has established a data transmission channel leading to a core PDN through an original AN node 1 and a CGW. That is, a first-type path has been established.

In 2, when the UE moves into coverage of an AN node 2, the AN node 2 initiates a handover request to a control plane. The handover request includes location information of the AN node 2. In the embodiment, the AN node 2 is a target access device required to be accessed.

In 3, the control plane (specifically for example, a connection management device) determines whether an EGW is deployed in this area through the location information of the AN node 2. If the EGW is deployed, a proper EGW is selected according to the location information and strategies of load balancing and the like to implement local shunting. The control plane sends a tunnel updating request (which may be, for example, a path updating request) to the CGW and determines an IP address and tunnel ID of the EGW as an endpoint of a downlink tunnel of the CGW.

In 4, the control plane sends the tunnel updating request to the AN node 2 (i.e., the target access device required to be accessed by the UE) and determines the IP address and tunnel ID of the EGW as an endpoint of an uplink tunnel of the AN node 2.

In 5, the control plane sends the tunnel updating request to the EGW, determines an IP address and tunnel ID of the CGW as an endpoint of an uplink tunnel of the EGW and determines an IP address and tunnel ID of the AN node 2 as an endpoint of a downlink tunnel of the EGW, so as to establish a second-type path.

In 6, the control plane sends a path handover reply to the AN node 2 to confirm completion of a handover process.

The above flow of the embodiment may be correspondingly extended to a terminal attachment flow. The above AN node may be extended to a third-party access base station (for example, the EGW is selected based on a third-party Wireless Local Area Network (WLAN)).

Second Example

Figure 7:
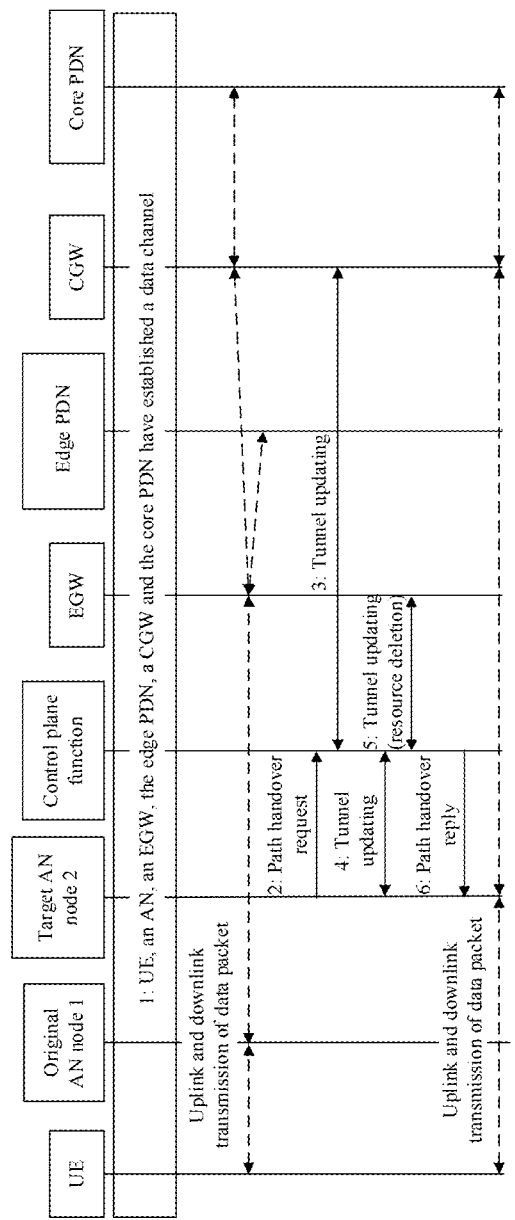
FIG. 7 is a third flowchart of a connection management method according to an embodiment of the disclosure.

When UE moves and a second forwarding plane (for example, an EGW in the figure) is dynamically deleted, a flow, as shown in FIG. 7, includes the following operations 1 to 6.

In 1, the UE has established a tandem transmission channel shown in the figure. Locally shunted data arrives at an edge network through an AN node 1 and an EGW. Other data arrives at a core PDN through the AN node 1, the EGW and a CGW. That is, a second-type path has been established.

In 2, when the UE moves into coverage of an AN node 2, the AN node 2 initiates a handover request to a control plane. The handover request includes location information of the AN node 2.

In 3, the control plane (specifically for example, a connection management device) determines whether an EGW is deployed in this area through the location information of the AN node 2. If no EGW is deployed, corresponding tunnel link adjustment is performed. The control plane sends a tunnel updating request to the CGW and determines an IP address and tunnel ID of the AN node 2 as an endpoint of a downlink tunnel of the CGW.

In 4, the control plane sends the tunnel updating request to the AN node 2 and determines an IP address and tunnel ID of the CGW as an endpoint of an uplink tunnel of the AN node 2.

In 5, the control plane sends the tunnel updating request to the EGW and releases a related tunnel resource of the EGW, namely implementing handover from the second-type path to a first-type path.

In 6, the control plane sends a path handover reply to the AN node 2 to confirm completion of a handover process.

Third Example

Figure 8:
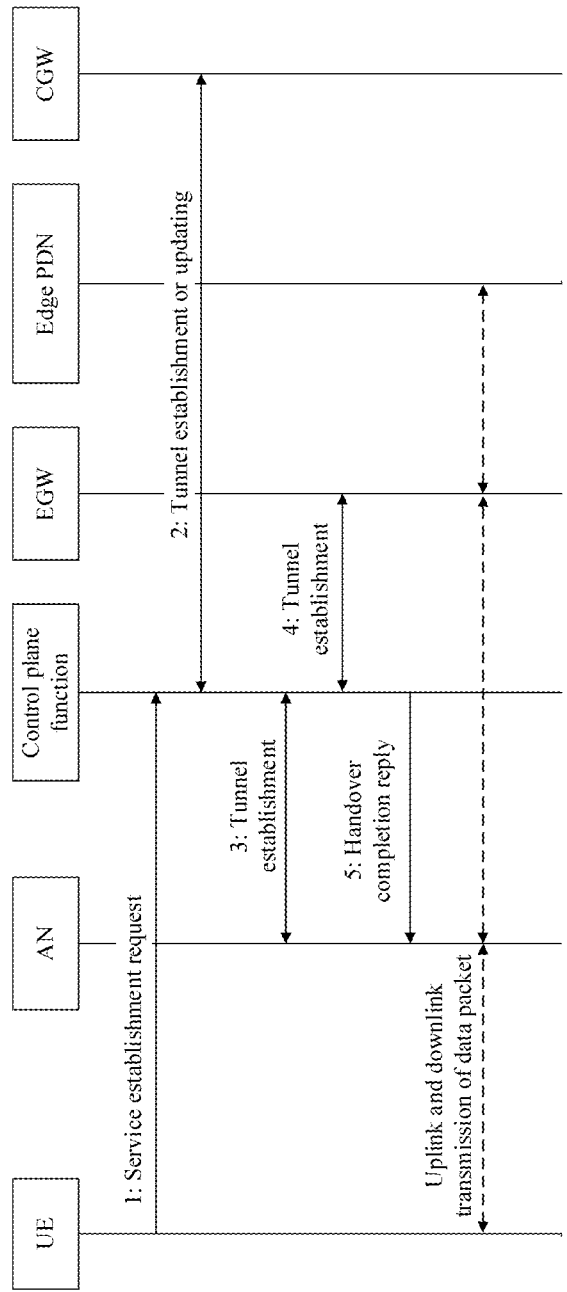
FIG. 8 is a fourth flowchart of a connection management method according to an embodiment of the disclosure.

When UE moves in an idle state and enters a coverage area of an EGW. In such case, if the UE changes from the idle state to an active state, an EGW addition flow, as shown in FIG. 8, includes the following operations 1 to 5.

In 1, a control plane sends a tunnel establishment or updating request to a CGW and determines an IP address and tunnel ID of the EGW as an endpoint of a downlink tunnel of the CGW.

In 2, the control plane sends the tunnel establishment request to an AN node and determines the IP address and tunnel ID of the EGW as an endpoint of an uplink tunnel of the AN node.

In 3 and 4, the control plane sends the tunnel establishment request to the EGW, determines an IP address and tunnel ID of the CGW as an endpoint of an uplink tunnel and determines an IP address and tunnel ID of the AN node as an endpoint of a downlink tunnel, namely implementing handover from a first-type path to a second-type path.

In 5, the control plane sends a path handover completion reply to the AN node 2 to confirm completion of a handover process.

Figure 9:
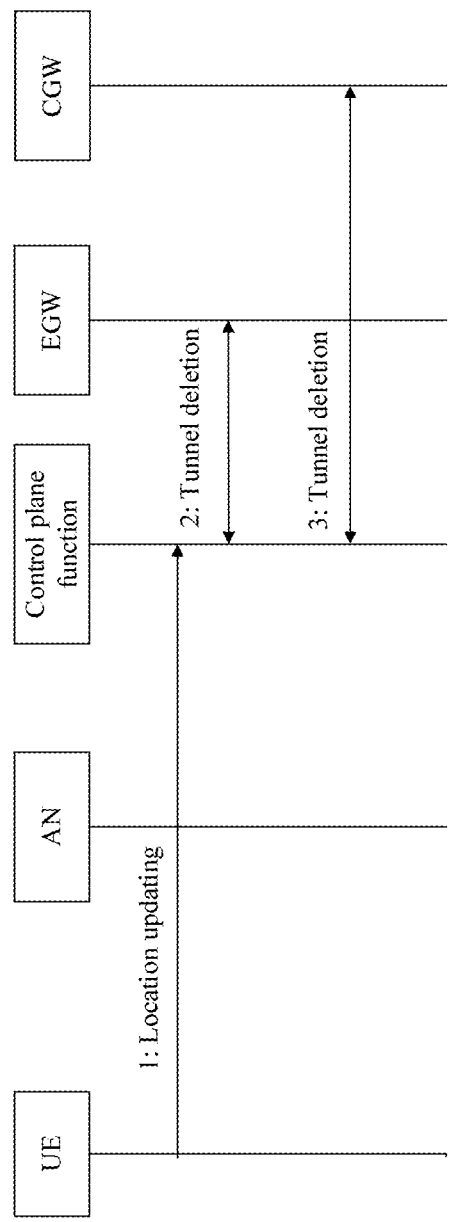
FIG. 9 is a fifth flowchart of a connection management method according to an embodiment of the disclosure.

A fourth example: when UE moves in an idle state and moves out of a coverage area of an EGW, an EGW deletion flow, as shown in FIG. 9, includes the following operations 1 to 3.

In 1, the UE initiates a location updating request after moving to change a location tracking area.

In 2, after a control plane determines movement out of an MEC area according to a location updating message and a new location area, the control plane sends a tunnel deletion request to the EGW to release a related tunnel resource.

In 3, the control plane sends the tunnel deletion request to a CGW to release a related tunnel resource, that is, a second-type path is replaced with a first-type path.

Fifth Example

Two pieces of relevant information, i.e., a location and a type of service, of a terminal device are considered for judgment.

For example, whether to trigger path handover may be comprehensively determined by considering whether an AN corresponding to a present location of the terminal device includes a second forwarding plane as well as the type of service of the terminal device. Specific descriptions will be made below.

When the type of service corresponding to the terminal device is switched from a first type of service to a second type of service and the AN at the present location of the terminal device includes coverage of the second forwarding plane, it may be determined that a connection path between the terminal device and the first forwarding plane is adjusted from a first-type path to a second-type path.

Thus it can be seen that, with adoption of the solution, whether to adjust the type of the path between the terminal device and the first forwarding plane may be determined at least based on an AN corresponding to the location of the terminal device. Specifically, the type of the path may include the first-type path for direct connection to the first forwarding path and the second-type path for connection to the first forwarding path through the second forwarding path. Therefore, flexibility and high efficiency of a network architecture may be achieved, gateway processing is implemented with a smallest number of hops in case of no local shunting, and edge network data may be accessed only by configuring of the type of the path on a network side without relatively more configuration changes made on a terminal device side.

Second Embodiment

A difference from the first embodiment is that descriptions are made in the embodiment mainly for a second triggering condition. Whether to adjust a type of a connection path between a terminal device and a first forwarding plane is determined at least based on an AN corresponding to a location of the terminal device. In a scenario provided in the embodiment, whether to trigger path handover may be determined only based on a type of service of the terminal device and whether coverage of the AN includes a second forwarding plane is not a key factor to be considered. If the AN includes the second forwarding plane and the type of service of the terminal device requires path optimization to be triggered, a connection may be established through the second forwarding plane logically at a relatively short distance away from the AN to provide a second-type path for the terminal device. Specific descriptions will be made as follows. When the type of service corresponding to the terminal device is switched from a first type of service to a second type of service, the connection path between the terminal device and the first forwarding plane is determined to be adjusted from a first-type path to the second-type path.

Herein, the first type of service is different from the second type of service, the second type of service is a type of service requiring local service shunting, and the first type of service is a type of service not requiring local service shunting.

Furthermore, before the operation that whether to adjust the type of the connection path between the terminal device and the first forwarding plane is determined based on the AN corresponding to the location of the terminal device and the type of service of the terminal device, the method further includes that: the terminal device establishes a connection with a core network through the first-type path at a location where the terminal device is currently located.

Correspondingly, the operation that whether to adjust the type of the connection path between the terminal device and the first forwarding plane is determined based on the AN corresponding to the location of the terminal device and the type of service of the terminal device includes that: when the AN corresponding to the location of the terminal device includes a second forwarding plane capable of optimizing a local service access path and it is detected that the type of service corresponding to the terminal device is switched from the first type of service to the second type of service, the connection path between the terminal device and the first forwarding plane is determined to be adjusted from the first-type path to the second-type path.

Herein, the first type of service is different from the second type of service, the second type of service is a type of service requiring local service shunting, and the first type of service is a type of service not requiring local service shunting.

Figure 4B:
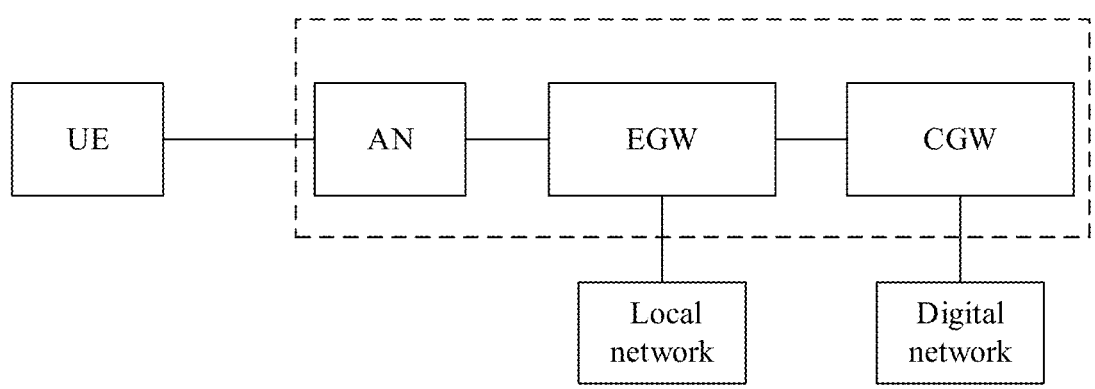
FIG. 4b is a schematic diagram of a second-type path according to an embodiment of the disclosure.

That is, a connection management device, when learning that the UE initiates an edge or local service, triggers updating of a connection between the AN and a CGW, dynamically adds a function of the second forwarding plane (for example, an EGW) and establishes a connection between the UE and the EGW, so as to form a network architecture shown in FIG. 4b.

After the connection path between the terminal device and the first forwarding plane is adjusted from the first-type path to the second-type path, a duration from a moment when the terminal device stops information interaction of the second type of service after completing information interaction of the second type of service for the last time till a present moment is detected.

When the duration exceeds a preset duration threshold, the connection path between the terminal device and the first forwarding plane is determined to be adjusted from the second-type path to the first-type path.

The connection management device (the network-side control plane), when sensing that UE with a second forwarding plane does not access a service of an edge network for a period of time, deletes the EGW in the path, namely implementing handover from the second-type path to the first-type path.

The connection management device learns that the terminal device accesses the edge or local service in at least one of the following manners.

A first manner: whether the first type of service of the terminal device is switched to the second type of service is determined through type of service information reported by the terminal device. That is, the UE notifies the network that signaling sent to the control plane by the UE includes the type of service information and the network side determines that a service of the UE is suitable to access the edge or local network through the type of service information. Then, an EGW connection is established.

A second manner: the connection management device senses from the network side that the service access path of the UE is required to be optimized. Specifically, the connection management device senses that the service of the UE is suitable to access the edge or local network. For example, the user plane notifies an IP address of a user to the control plane according to a service destination address accessed by the user and the like.

A third manner: notification information sent by a server side corresponding to the service used by the terminal device is received to determine the type of service of the terminal device. For example, the network is notified directly or through a capability exposure interface that a certain user is required to establish a link to the edge network.

When the connection management device senses that only the terminal device connected to the core layer is required to establish a data channel to the edge (or local) network or a data packet is required to be shunted at the edge, the control plane of the core network triggers the second forwarding plane (or a network function of the user plane) to be added into the existing data channel and updates the tunnel. In such a manner, data required to be routed in the edge network is forwarded and shunted through the second forwarding plane and another data stream arrives at the CGW through the second forwarding plane and further arrives at the core PDN. The UE does not sense a change of the network in this process. When the network senses that the connection passing through the second forwarding plane does not require the data channel to the edge network any more, the network triggers updating of the connection path and deletes the second forwarding plane (for example, the EGW) in the transmission path. Therefore, all the data may enter the PDN through a hop.

When the UE initiates a data service, the network determines that the second forwarding plane (for example, the EGW) is required to be introduced to optimize the data channel and triggers addition of the second forwarding plane, and the control plane initiates a session updating flow to the AN, notifies the IP address and tunnel ID of the uplink tunnel of the EGW to the AN as the endpoint of the uplink tunnel of the AN and notifies the IP address and tunnel ID of the downlink tunnel of the EGW to the CGW as the endpoint of the downlink tunnel of the CGW.

If it is determined that the terminal device does not initiate a service accessing a local cache within a period of time, EGW deletion operations are triggered and may specifically include the following operations A) to B).

In A), the session updating flow is initiated to the AN (a target access device), and the IP address and tunnel ID of the uplink tunnel of the CGW are notified to the AN (the target access device) as an endpoint of the uplink tunnel of the AN.

In B), an IP address and tunnel ID of a downlink tunnel of the AN (the target access device) are notified to the CGW as the endpoint of the downlink tunnel of the CGW.

A scenario provided in the embodiment will be exemplarily described below in combination with the drawings.

First Example

Figure 10:
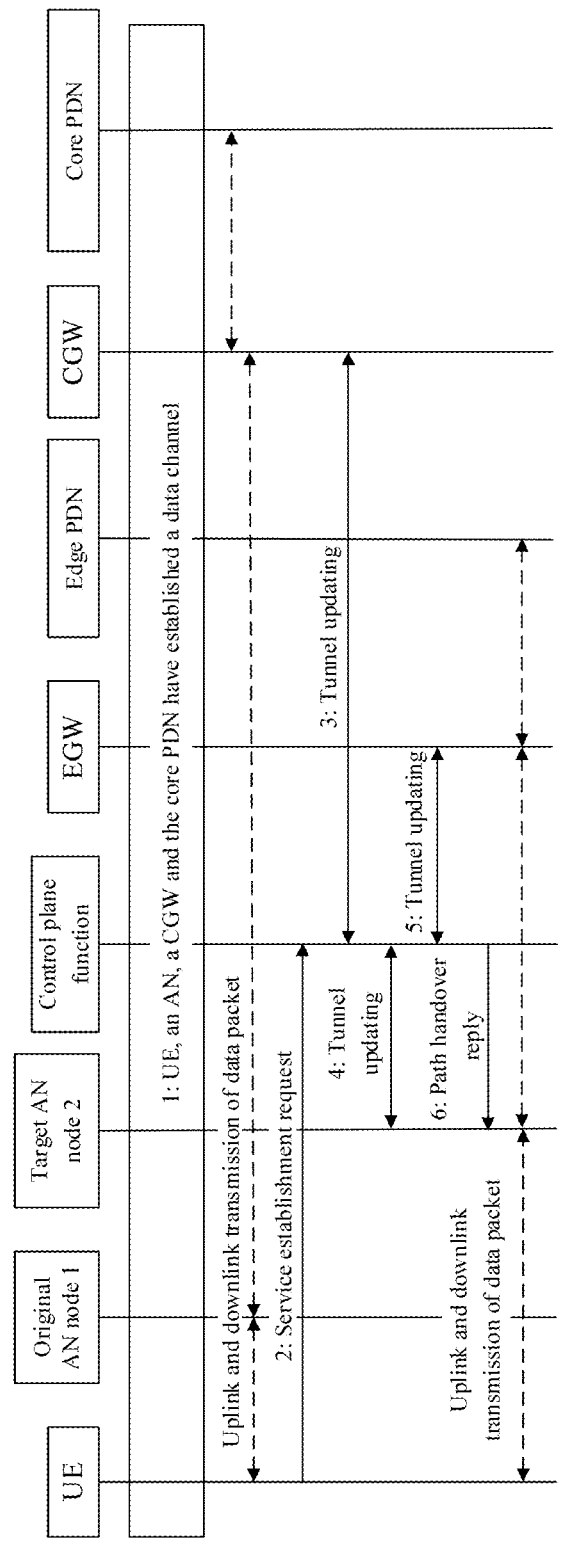
FIG. 10 is a sixth flowchart of a connection management method according to an embodiment of the disclosure.

When a network side determines that a service initiated by UE may be locally shunted, an EGW addition flow, as shown in FIG. 10, includes the following operations 1 to 5.

In 1, the UE has established a data transmission channel leading to a core PDN through an original AN node 1 and a CGW, namely a first-type path has been established. That is, the UE has established the first-type path with a first forwarding plane through an access device of an AN.

In 2, when the UE initiates a service establishment request, type of service information is contained for sending to a control plane. The network control plane determines whether a type of service supports local shunting. If a service is an MEC service, a network connection, shown in FIG. 2, from the UE to an EGW and then to a CGW is established. Operations 3, 4, 5 and 6 are the same as those in FIG. 6 (i.e., the first example in the first embodiment) and will not be elaborated herein.

In addition, operation 2 may also be as follows: the control plane interacts with the CGW to determine whether the UE accesses the MEC service. If YES, operations 3, 4 and 5 are consistent with those in FIG. 4.

Operation 2 may also be as follows: the control plane interacts with a capability exposure platform interface to determine whether the UE accesses the MEC service. If YES, operations 3, 4 and 5 are consistent with those in FIG. 4.

Second Example

Figure 11:
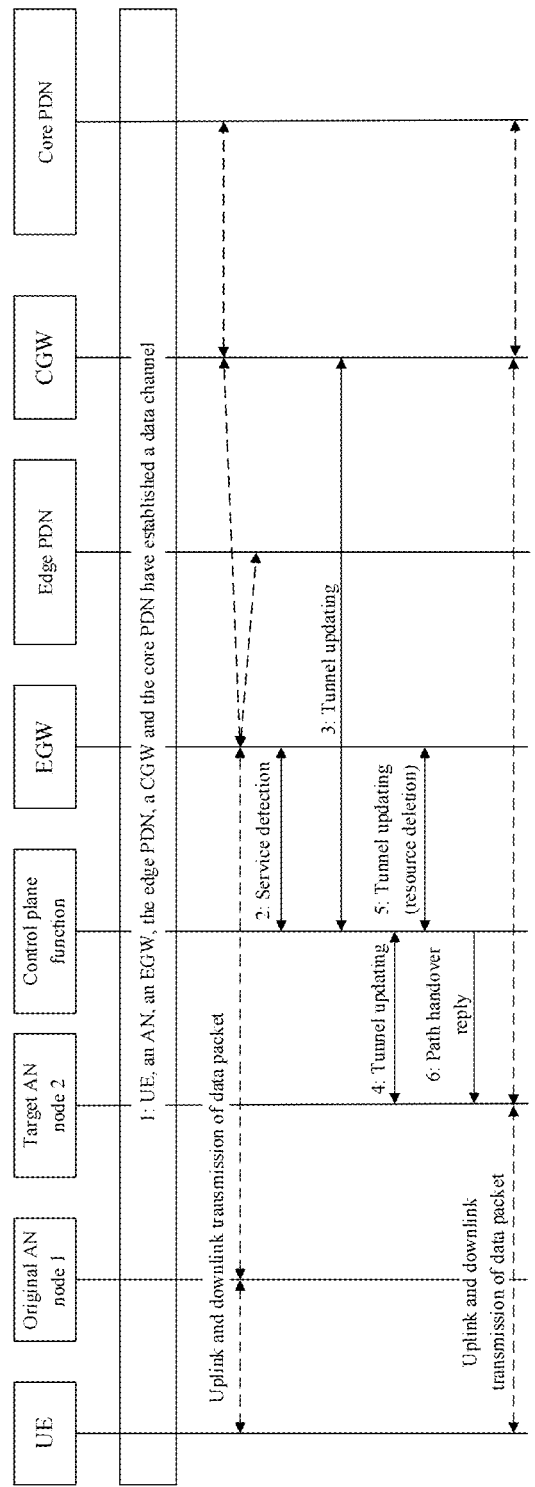
FIG. 11 is a seventh flowchart of a connection management method according to an embodiment of the disclosure.

When a network side determines that local shunting of a service initiated by UE has been completed, an EGW deletion flow, as shown in FIG. 11, includes the following operations 1 to 6.

In 1, the UE has established a tandem transmission channel shown in the figure. Locally shunted data arrives at an edge network through an AN node 1 and an EGW. Other data arrives at a core PDN through the AN node 1, the EGW and a CGW. That is, a second-type path has been established.

In 2, a control plane sends a service detection request to the EGW to detect whether the UE runs an MEC service. The EGW gives a reply that the MEC service has been ended to the control plane. The control plane triggers the flow to delete the EGW. 3, 4, 5 and 6 are consistent with operations in FIG. 7 (the second example in the first embodiment).

Operation 2 may also be as follows: the control plane interacts with a capability exposure interface to determine whether the UE ends access to the MEC service. If YES, operations 3, 4 and 5 are consistent with those in FIG. 5.

When the UE moves to an area (MEC) with a second forwarding plane (for example, the EGW) serving, the network control plane dynamically introduces the EGW into a tunnel path of a user plane in a tunnel updating related flow, for example, a flow of handover in a connected state or session establishment initiated by the UE. That is, AN<->CGW is changed into AN<->EGW<->CGW.

In a handover message flow, downlink identification information of the EGW, which may be, but not limited to, an IP address and tunnel ID of a downlink tunnel, is notified to the CGW as an endpoint of a downlink tunnel of the CGW; and uplink identification information of the EGW, which may be, but not limited to, an IP address and tunnel ID of an uplink tunnel, is notified to an AN as an endpoint of an uplink tunnel of the AN.

When the UE moves out of the MEC area, the network control plane establishes a through tunnel, i.e., AN<->CGW, from the AN to the CGW in the tunnel updating related flow, for example, the flow of handover in the connected state or session establishment initiated by the UE.

The control plane notifies identification information corresponding to the AN, which may be, but not limited to, a tunnel ID and an IP address, to the CGW as an endpoint of the downlink tunnel of the CGW, and notifies identification information of the CGW, the identification information being, but not limited to, an IP address and a tunnel ID, to the AN as an endpoint of the uplink tunnel of the AN.

For the through tunnel or the tunnel passing through the EGW, the UE initiates a related flow for mutual handover when the UE moves; and the network may also make a judgment according to a user service, and the network side triggers handover between the two tunnels.

The network side determines through the type of service that the second forwarding plane is required to be introduced to optimize the data channel.

The UE notifies the network that signaling sent to the control plane by the UE includes the type of service information and the network side determines that a service of the UE is suitable to access the edge or local network through the type of service information. Then, an EGW connection is established.

The network autonomously senses that the service of the UE is suitable to access the edge or local network. For example, the user plane notifies an IP address of a user to the control plane according to a service destination address accessed by the user and the like.

A service side notifies the network directly or through the capability exposure interface that a certain user is required to establish a link to the edge network.

Compared with the conventional art, the embodiment has the following advantages. When the UE is not required to introduce multiple IP addresses to implement MEC (or local shunting) during session connection, and there is only one IP address anchor. When the UE is out of coverage of the EGW or the network determines that local shunting is not required, the EGW may be dynamically deleted, so that a data packet may enter the core PDN by one hop only through the CGW, and flattening performance of the network is maintained. When the UE is within the coverage of the EGW and the network determines that local shunting is required, the EGW may be dynamically added into the network, thereby implementing local shunting. The UE is unaware, behaviors of the UE are simplified and, meanwhile, unified configuration and management of an edge traffic forwarding strategy by the network is also facilitated.

Thus it can be seen that, with adoption of the solution, whether to adjust the type of the path between the terminal device and the first forwarding plane may be determined at least based on an AN corresponding to the location of the terminal device. Specifically, the type of the path may include the first-type path for direct connection to the first forwarding path and the second-type path for connection to the first forwarding path through the second forwarding path. Therefore, flexibility and high efficiency of a network architecture may be achieved, gateway processing is implemented with a smallest number of hops in case of no local shunting, and edge network data may be accessed without relatively more configuration changes made on a terminal device side.

Third Embodiment

Figure 12:
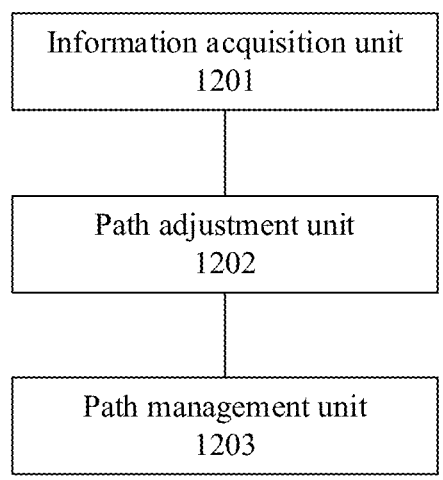
FIG. 12 is a first structure diagram of a connection management device according to an embodiment of the disclosure.

The embodiment of the disclosure provides a connection management device, which, as shown in FIG. 12, includes an information acquisition unit 1201 and a path adjustment unit 1202.

The information acquisition unit 1201 detects relevant information of a terminal device.

The path adjustment unit 1202 determines whether to adjust a type of a connection path between the terminal device and a first forwarding plane based on the relevant information of the terminal device.

The connection path between the terminal device and the first forwarding plane at least includes: a first-type path which is a connection path directly established with the first forwarding plane by the terminal device through an AN; and a second-type path which is a connection path established with the first forwarding path by the terminal device through the AN via a second forwarding plane.

Herein, the relevant information of the terminal device includes at least one of a location of the terminal device or a present type of service of the terminal device.

The information acquisition unit 1201 is configured to acquire the present location of the terminal device, and/or, acquire the present type of service of the terminal device.

The path adjustment unit 1202 is configured to determine whether to adjust the type of the connection path between the terminal device and the first forwarding plane based on at least one of the present location of the terminal device or the present type of service of the terminal device.

The connection path between the terminal device and the first forwarding plane at least includes: the first-type path which is a connection path directly established with the first forwarding plane by the terminal device through the AN; and the second-type path which is a connection path established with the first forwarding path by the terminal device through the AN via the second forwarding plane.

Herein, the connection management device is mainly arranged in a core network and may specifically be implemented in a manner that a module is arranged in a certain device in the core network and, for example, may be arranged in an MME in the core network.

The present location of the terminal device may be acquired in the following manners: an access device presently to be accessed by the terminal device is detected, and identification information of the access device (for example, an ID of the access device) is acquired; an area corresponding to the access device is determined based on the identification information of the access device (for example, a core network side may determine an area code corresponding to the access device through the identification information of the access device); and the present location of the terminal device is determined based on the area corresponding to the access device.

Herein, the access device may be a device, which may be a base station or may also be an AP and the like, configured to provide a direct access manner for the terminal device.

Specifically, there are two triggering conditions in the solution. The first triggering condition refers to determining whether the terminal device is located in an AN capable of implementing local service shunting based on a change of the location of the terminal device, thereby determining whether to adjust the type of the path of the terminal device.

In addition, the second triggering condition refers to determining whether to adjust the type of the path of the terminal device in combination with whether the terminal device has a local service shunting requirement.

The embodiment is mainly for the first triggering condition. UE only establishes a session connection oriented to a CGW as a default during session connection. When the UE moves into coverage of a gateway capable of supporting local shunting, a control plane initiates establishment of a new tunnel, thereby adding the EGW into an existing session, that is, the first-type path is handed over to the second-type path. When the UE moves out of the coverage of the EGW, the control plane may trigger a new tunnel establishment mechanism to delete the EGW from the session path, establish the second-type path and delete the first-type path.

A first scenario: the connection management device further includes a path management unit 1203, configured to determine that the terminal device establishes the first-type path with the first forwarding plane through a first access device, the first access device being different from the target access device required to be accessed by the terminal device at the present location and coverage corresponding to the first access device not including the second forwarding plane or being unsuitable for access to the second forwarding plane.

Correspondingly, the path adjustment unit 1202 is configured to, when a location where the terminal is currently located enables the second forwarding plane to be accessed or a second forwarding plane suitable for the terminal device to be accessed, determine to adjust the path between the terminal device and the first forwarding plane from the first-type path to the second-type path. That is, the core network side may determine, according to the present location (for example, the area code) of the terminal device, whether there is a second forwarding plane capable of optimizing a local service access path at the location.

It is to be understood that, in the scenario, when the terminal device initially accesses the network, the connection management device may determine a type of a path initially established by the terminal device based on whether the AN where the terminal device is located includes the second forwarding plane. When the AN does not include or is unsuitable for access to the second forwarding plane, the terminal device establishes the first-type path when initially accessing the network and, as shown in FIG. 4a, directly establishes a connection with the first forwarding plane. When the AN includes the second forwarding plane (for example, the EGW in the figure), the terminal device establishes the second-type path shown in FIG. 4b when initially accessing the network, and establishes the connection with the first forwarding plane (for example, the CGW in the figure) through the second forwarding plane (for example, the EGW in the figure).

After the terminal device, for example, the UE, moves to a new location, the control plane (i.e., the connection management device) acquires a present location of the AN and determines whether the second forwarding plane presently exists. If the second forwarding plane exists, the control plane acquires information of the second forwarding plane (for example, an IP address thereof) through an ID of the present AN (for example, an ID of an access base station or information of a location area, for example, a TA).

If the path between the terminal device and the first forwarding plane is determined to be adjusted from the first-type path to the second-type path, the corresponding second forwarding plane is selected for the terminal device, downlink identification information of the second forwarding plane is sent to the first forwarding plane and uplink identification information of the second forwarding plane is sent to the AN side, so as to establish the second-type path between the terminal device and the first forwarding plane through the second forwarding plane.

That is, after the first-type path is determined to be adjusted to the second-type path, it is also necessary to notify the terminal device to adjust the type of the path and notify the second forwarding plane to be accessed by the terminal device.

Specifically, if the terminal device moves in a connected state, the second forwarding plane (for example, the EGW) may be determined as opposite ends of tunnels of the base station and the first forwarding plane (for example, the CGW) in a handover message, which may include the following operations.

An IP address and tunnel ID of a downlink tunnel of the EGW are notified to the CGW as an endpoint of a downlink tunnel of the CGW; and an IP address and tunnel ID of an uplink tunnel of the EGW are notified to the AN as an endpoint of an uplink tunnel of the AN.

If the terminal device moves from a non-MEC area to an MEC area in an idle mode and when the UE actively initiates a service or the UE is triggered to initiate session establishment after network paging responsive to arrival of downlink data, the network determines whether to update the connection according to the present location. If the connection is required to be updated, the control plane does not establish a new tunnel between the CGW and the AN but establishes a tunnel among the AN, the EGW and the CGW.

A second scenario: a difference from the first scenario is that adjustment of the first-type path to the second-type path is introduced in the first scenario and adjustment of the second-type path to the first-type path is described in the scenario.

The path management unit is configured for the terminal device to establish the second-type path with the first forwarding plane through a second access device, the second access device being different from the target access device required to be accessed by the terminal device at the present location and there being the second forwarding plane or the second forwarding plane suitable for the terminal device to access at a present location of the second access device.

Correspondingly, the path adjustment unit is configured to, when there is no second forwarding plane or second forwarding plane suitable for the terminal device to access at a location where the terminal device is currently located, determine to adjust the path between the terminal device and the first forwarding plane from the second-type path to the first-type path.

The path adjustment unit is configured to, responsive to determining to adjust the path between the terminal device and the first forwarding plane from the second-type path to the first-type path, notify the identification information corresponding to the AN to the first forwarding plane and notify the identification information of the first forwarding plane to the AN, so as to establish the first-type path between the terminal device and the first forwarding plane.

After the terminal device moves to a new location, if the control plane determines through the present location of the AN that the second forwarding plane (for example, the EGW) is not required any more in a present session, information of the middle EGW is not included in connection updating, and a data channel of the user plane changes into a direct connection of the AN and the CGW.

Specifically, in the connected state, the AN and the CGW are directly determined as mutual tunnel opposite ends in a handover message from the MEC area to the non-MEC area: a corresponding tunnel ID and IP of the AN are notified to the CGW as an endpoint of a downlink tunnel of the CGW; and an IP address and tunnel ID of the tunnel of the CGW are notified to the AN as an endpoint of an uplink tunnel of the AN.

If the UE moves to the non-MEC area in the idle state, the network performs location updating to further release a user-plane tunnel between the EGW and the CGW, and a new tunnel is a direct one-hop tunnel of the AN and the CGW next time when the UE turns from idle to active.

Thus it can be seen that, with adoption of the solution, whether to adjust the type of the path between the terminal device and the first forwarding plane may be determined at least based on an AN corresponding to the location of the terminal device. Specifically, the type of the path may include the first-type path for direct connection to the first forwarding path and the second-type path for connection to the first forwarding path through the second forwarding path. Therefore, flexibility and high efficiency of a network architecture may be achieved, gateway processing is implemented with a smallest number of hops in case of no local shunting, and edge network data may be accessed only by configuring of the type of the path on a network side without relatively more configuration changes made on a terminal device side.

Fourth Embodiment

Descriptions are made in the embodiment mainly for a second triggering condition. The path adjustment unit is configured to determine whether to adjust the type of the connection path between the terminal device and the first forwarding plane at least based on an AN corresponding to the location of the terminal device and a type of service of the terminal device.

Specifically, before the operation that whether to adjust the type of the connection path between the terminal device and the first forwarding plane is determined based on the AN corresponding to the location of the terminal device and the type of service of the terminal device, the path management unit is configured to determine that the terminal device establishes a connection with a core network through the first-type path at a location where the terminal device currently located.

Correspondingly, the path adjustment unit is configured to, when the AN corresponding to the location of the terminal device includes a second forwarding plane capable of optimizing a local service access path and it is detected that the type of service corresponding to the terminal device is switched from the first type of service to the second type of service, determine to adjust the connection path between the terminal device and the first forwarding plane from the first-type path to the second-type path.

Herein, the first type of service is different from the second type of service, the second type of service is a type of service requiring local service shunting, and the first type of service is a type of service not requiring local service shunting.

The path adjustment unit is configured to, after the connection path between the terminal device and the first forwarding plane is adjusted from the first-type path to the second-type path, detect a duration from a moment when the terminal device stops information interaction of the second type of service after completing information interaction of the second type of service for the last time till a present moment, and when the duration exceeds a preset duration threshold, determine to adjust the connection path between the terminal device and the first forwarding plane from the second-type path to the first-type path.

That is, the path adjustment unit is configured to, when learning that the UE initiates an edge or local service, trigger updating of a connection between the AN and a CGW, dynamically add a function of the second forwarding plane (for example, an EGW) and establish a connection between the UE and the EGW, so as to form a network architecture shown in FIG. 4b.

After the connection path between the terminal device and the first forwarding plane is adjusted from the first-type path to the second-type path, the duration from a moment when the terminal device stops information interaction of the second type of service after completing information interaction of the second type of service for the last time till the present moment is detected.

When the duration exceeds the preset duration threshold, the connection path between the terminal device and the first forwarding plane is determined to be adjusted from the second-type path to the first-type path.

The connection management device (the network-side control plane), when sensing that UE with a second forwarding plane does not access a service of an edge network for a period of time, deletes the EGW in the path, namely implementing handover from the second-type path to the first-type path.

The connection management device learns that the terminal device accesses the edge or local service in at least one of the following manners.

A first manner: whether the first type of service of the terminal device is switched to the second type of service is determined through type of service information reported by the terminal device. That is, the UE notifies the network that signaling sent to the control plane by the UE includes the type of service information and the network side determines that a service of the UE is suitable to access the edge or local network through the type of service information. Then, an EGW connection is established.

A second manner: the connection management device senses from the network side that the service access path of the UE is required to be optimized. Specifically, the connection management device senses that the service of the UE is suitable to access the edge or local network. For example, the user plane notifies an IP address of a user to the control plane according to a service destination address accessed by the user and the like.

A third manner: notification information sent by a server side corresponding to the service used by the terminal device is received to determine the type of service of the terminal device. For example, the network is notified directly or through a capability exposure interface that a certain user is required to establish a link to the edge network.

When the connection management device senses that only the terminal device connected to the core layer is required to establish a data channel to the edge (or local) network or a data packet is required to be shunted at the edge, the control plane of the core network triggers the second forwarding plane (or a network function of the user plane) to be added into the existing data channel and updates the tunnel. In such a manner, data required to be routed in the edge network is forwarded and shunted through the second forwarding plane and another data stream arrives at the CGW through the second forwarding plane and further arrives at the core PDN. The UE does not sense a change of the network in this process. When the network senses that the connection passing through the second forwarding plane does not require the data channel to the edge network any more, the network triggers updating of the connection path and deletes the second forwarding plane EGW in the transmission path. Therefore, all the data may enter the PDN through a hop.

When the UE initiates a data service, the network determines that the second forwarding plane (for example, the EGW) is required to be introduced to optimize the data channel and triggers addition of the second forwarding plane, and the control plane initiates a session updating flow to the AN, notifies the IP address and tunnel ID of the uplink tunnel of the EGW to the AN as the endpoint of the uplink tunnel of the AN and notifies the IP address and tunnel ID of the downlink tunnel of the EGW to the first forwarding plane (for example, the CGW in the figure) as the endpoint of the downlink tunnel of the CGW.

If it is determined that the terminal device does not initiate a service accessing a local cache within a period of time, EGW deletion operations are triggered and may specifically include the following operations.

The path adjustment unit is configured to initiate a session updating flow to the AN, notify the IP address and tunnel ID of the uplink tunnel of the CGW to the AN as an endpoint of the uplink tunnel of the AN and notify the IP address and tunnel ID of the downlink tunnel of the AN to the CGW as an endpoint of the downlink tunnel of the CGW.

Thus it can be seen that, with adoption of the solution, whether to adjust the type of the path between the terminal device and the first forwarding plane may be determined at least based on an AN corresponding to the location of the terminal device. Specifically, the type of the path may include the first-type path for direct connection to the first forwarding path and the second-type path for connection to the first forwarding path through the second forwarding path. Therefore, flexibility and high efficiency of a network architecture may be achieved, gateway processing is implemented with a smallest number of hops in case of no local shunting, and edge network data may be accessed without relatively more configuration changes made on a terminal device side.

Fifth Embodiment

Figure 13:
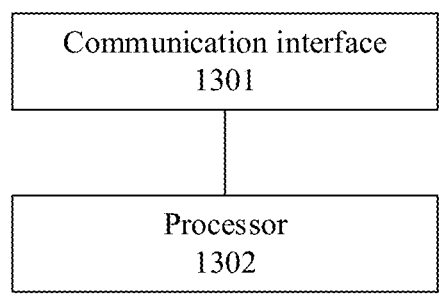
FIG. 13 is a second structure diagram of a connection management device according to an embodiment of the disclosure.

The embodiment provides a connection management device, which, as shown in FIG. 13, includes a communication interface 1301 and a processor 1302.

The communication interface 1301 detects relevant information of a terminal device.

The processor 1302 determines whether to adjust a type of a connection path between the terminal device and a first forwarding plane based on the relevant information of the terminal device.

The connection path between the terminal device and the first forwarding plane at least includes: the first-type path which is a connection path directly established with the first forwarding plane by the terminal device through the AN; and the second-type path which is a connection path established with the first forwarding path by the terminal device through the AN via the second forwarding plane.

Specifically, the relevant information of the terminal device includes at least one of a location of the terminal device or a present type of service of the terminal device.

Herein, the connection management device is mainly arranged in a core network and may specifically be implemented in a manner that a module is arranged in a certain device in the core network and, for example, may be arranged in an MME in the core network.

The present location of the terminal device may be acquired in the following manners: an access device presently to be accessed by the terminal device is detected, and identification information of the access device (for example, an ID of the access device) is acquired; an area corresponding to the access device is determined based on the identification information of the access device (for example, a core network side may determine an area code corresponding to the access device through the identification information of the access device); and the present location of the terminal device is determined based on the area corresponding to the access device.

Herein, the access device may be a device, which may be a base station or may also be an AP and the like, configured to provide a direct access manner for the terminal device.

Specifically, there are two triggering conditions in the solution. The first triggering condition refers to determining whether the terminal device is located in an AN capable of implementing local service shunting based on a change of the location of the terminal device, thereby determining whether to adjust the type of the path of the terminal device. In addition, the second triggering condition refers to determining whether to adjust the type of the path of the terminal device in combination with whether the terminal device has a local service shunting requirement.

A first triggering condition: UE only establishes a session connection oriented to a CGW as a default during session connection. When the UE moves into coverage of a gateway capable of supporting local shunting, a control plane initiates establishment of a new tunnel, thereby adding the EGW into an existing session, that is, the first-type path is handed over to the second-type path. When the UE moves out of the coverage of the EGW, the control plane may trigger a new tunnel establishment mechanism to delete the EGW from the session path, establish the second-type path and delete the first-type path.

A first scenario: the processor 1302 determines that the terminal device establishes the first-type path with the first forwarding plane through a first access device, the first access device being different from the target access device required to be accessed by the terminal device at the present location and coverage corresponding to the first access device not including the second forwarding plane or being unsuitable for access to the second forwarding plane.

When a location where the terminal is currently located enables the second forwarding plane to be accessed or a second forwarding plane suitable for the terminal device to be accessed, the path between the terminal device and the first forwarding plane is determined to be adjusted from the first-type path to the second-type path. That is, the core network side may determine, according to the present location (for example, the area code) of the terminal device, whether there is a second forwarding plane capable of optimizing a local service access path at the location.

It is to be understood that, in the scenario, when the terminal device initially accesses the network, the connection management device may determine a type of a path initially established by the terminal device based on whether the AN where the terminal device is located includes the second forwarding plane. When the AN does not include or is unsuitable for access to the second forwarding plane, the terminal device establishes the first-type path when initially accessing the network and, as shown in FIG. 4*a*, directly establishes a connection with the first forwarding plane. When the AN includes the second forwarding plane, the terminal device establishes the second-type path shown in FIG. 4*b* when initially accessing the network, and establishes the connection with the first forwarding plane through the second forwarding plane.

After the terminal device, for example, the UE, moves to a new location, the control plane (i.e., the connection management device) acquires a present location of the AN and determines whether the second forwarding plane presently exists. If the second forwarding plane exists, the control plane acquires information of the second forwarding plane (the EGW) (for example, an IP address thereof) through an ID of the present AN (for example, an ID of an access base station or information of a location area, for example, a TA).

If the path between the terminal device and the first forwarding plane is determined to be adjusted from the first-type path to the second-type path, the corresponding second forwarding plane is selected for the terminal device, downlink identification information of the second forwarding plane is sent to the first forwarding plane and uplink identification information of the second forwarding plane is sent to the AN side, so as to establish the second-type path between the terminal device and the first forwarding plane through the second forwarding plane.

That is, after the first-type path is determined to be adjusted to the second-type path, it is also necessary to notify the terminal device to adjust the type of the path and notify the second forwarding plane to be accessed by the terminal device.

Specifically, if the terminal device moves in a connected state, the second forwarding plane (for example, the EGW) may be determined as opposite ends of tunnels of the base station and the first forwarding plane (for example, the CGW) in a handover message, which may include the following operations.

An IP address and tunnel ID of a downlink tunnel of the EGW are notified to the CGW as an endpoint of a downlink tunnel of the CGW; and an IP address and tunnel ID of an uplink tunnel of the EGW are notified to the AN as an endpoint of an uplink tunnel of the AN.

If the terminal device moves from a non-MEC area to an MEC area in an idle mode and when the UE actively initiates a service or the UE is triggered to initiate session establishment after network paging responsive to arrival of downlink data, the network determines whether to update the connection according to the present location. If the connection is required to be updated, the control plane does not establish a new tunnel between the CGW and the AN but establishes a tunnel among the AN, the EGW and the CGW.

A second scenario: a difference from the first scenario is that adjustment of the first-type path to the second-type path is introduced in the first scenario and adjustment of the second-type path to the first-type path is described in the scenario.

The processor 1302 establishes, by the terminal device, the second-type path with the first forwarding plane through a second access device, the second access device being different from the target access device required to be accessed by the terminal device at the present location and there being the second forwarding plane or the second forwarding plane suitable for the terminal device to access at a present location of the second access device.

When there is no second forwarding plane or no second forwarding plane suitable for the terminal device to access at a location where the terminal device is currently located, the path between the terminal device and the first forwarding plane is determined to be adjusted from the second-type path to the first-type path.

The processor 1302, responsive to determining to adjust the path between the terminal device and the first forwarding plane from the second-type path to the first-type path, notifies the identification information corresponding to the AN to the first forwarding plane and notifies the identification information of the first forwarding plane to the AN, so as to establish the first-type path between the terminal device and the first forwarding plane.

After the terminal device moves to a new location, if the control plane determines through the present location of the AN that the second forwarding plane is not required any more in a present session, information of the middle EGW is not included in connection updating, and a data channel of the user plane changes into a direct connection of the AN and the CGW.

Specifically, in the connected state, the AN and the CGW are directly determined as mutual tunnel opposite ends in a handover message from the MEC area to the non-MEC area: a corresponding tunnel ID and IP of the AN are notified to the CGW as an endpoint of a downlink tunnel of the CGW; and an IP address and tunnel ID of the tunnel of the CGW are notified to the AN as an endpoint of an uplink tunnel of the AN.

If the UE moves to the non-MEC area in the idle state, the network performs location updating to further release a user-plane tunnel between the EGW and the CGW, and a new tunnel is a direct one-hop tunnel of the AN and the CGW next time when the UE turns from idle to active.

A second triggering condition

The processor 1302 determines whether to adjust the type of the connection path between the terminal device and the first forwarding plane based on an AN corresponding to at least one of the location of the terminal device or the type of service of the terminal device.

Specifically, before the operation that whether to adjust the type of the connection path between the terminal device and the first forwarding plane is determined based on the AN corresponding to the location of the terminal device and the type of service of the terminal device, the path management unit is configured to determine that the terminal device establishes a connection with a core network through the first-type path at a location where the terminal device is currently located.

When the AN corresponding to the location of the terminal device includes a second forwarding plane capable of optimizing a local service access path and it is detected that the type of service corresponding to the terminal device is switched from the first type of service to the second type of service, the connection path between the terminal device and the first forwarding plane is determined to be adjusted from the first-type path to the second-type path.

Herein, the first type of service is different from the second type of service, the second type of service is a type of service requiring local service shunting, and the first type of service is a type of service not requiring local service shunting.

The processor 1302, after the connection path between the terminal device and the first forwarding plane is adjusted from the first-type path to the second-type path, detects a duration from a moment when the terminal device stops information interaction of the second type of service after completing information interaction of the second type of service for the last time till a present moment, and when the duration exceeds a preset duration threshold, determines to adjust the connection path between the terminal device and the first forwarding plane from the second-type path to the first-type path.

That is, the processor 1302, when learning that the UE initiates an edge or local service, triggers updating of a connection between the AN and a CGW, dynamically adds a function of the second forwarding plane and establishes a connection between the UE and the EGW, so as to form a network architecture shown in FIG. 4*b*.

After the connection path between the terminal device and the first forwarding plane is adjusted from the first-type path to the second-type path, the duration from a moment when the terminal device stops information interaction of the second type of service after completing information interaction of the second type of service for the last time till the present moment is detected.

When the duration exceeds the preset duration threshold, the connection path between the terminal device and the first forwarding plane is determined to be adjusted from the second-type path to the first-type path.

The connection management device (the network-side control plane), when sensing that UE with a second forwarding plane does not access a service of an edge network for a period of time, deletes the EGW in the path, namely implementing handover from the second-type path to the first-type path.

The connection management device learns that the terminal device accesses the edge or local service in at least one of the following manners.

A first manner: whether the first type of service of the terminal device is switched to the second type of service is determined through type of service information reported by the terminal device. That is, the UE notifies the network that signaling sent to the control plane by the UE includes the type of service information and the network side determines that a service of the UE is suitable to access the edge or local network through the type of service information. Then, an EGW connection is established.

A second manner: the processor 1302 senses from the network side that the service access path of the UE is required to be optimized. Specifically, the connection management device senses that the service of the UE is suitable to access the edge or local network. For example, the user plane notifies an IP address of a user to the control plane according to a service destination address accessed by the user and the like.

A third manner: notification information sent by a server side corresponding to the service used by the terminal device is received to determine the type of service of the terminal device. For example, the network is notified directly or through a capability exposure interface that a certain user is required to establish a link to the edge network.

When the connection management device senses that only the terminal device connected to the core layer is required to establish a data channel to the edge (or local) network or a data packet is required to be shunted at the edge, the control plane of the core network triggers the second forwarding plane (or a network function of the user plane) to be added into the existing data channel and updates the tunnel. In such a manner, data required to be routed in the edge network is forwarded and shunted through the second forwarding plane and another data stream arrives at the CGW through the second forwarding plane and further arrives at the core PDN. The UE does not sense a change of the network in this process. When the network senses that the connection passing through the second forwarding plane does not require the data channel to the edge network any more, the network triggers updating of the connection path and deletes the second forwarding plane EGW in the transmission path. Therefore, all the data may enter the PDN through a hop.

When the UE initiates a data service, the network determines that the second forwarding plane is required to be introduced to optimize the data channel and triggers addition of the second forwarding plane, and the control plane initiates a session updating flow to the AN, notifies the IP address and tunnel ID of the uplink tunnel of the EGW to the AN as the endpoint of the uplink tunnel of the AN and notifies the IP address and tunnel ID of the downlink tunnel of the EGW to the CGW as the endpoint of the downlink tunnel of the CGW.

If it is determined that the terminal device does not initiate a service accessing a local cache within a period of time, EGW deletion operations are triggered and may specifically include the following operations.

The path adjustment unit is configured to initiate a session updating flow to the AN, notify the IP address and tunnel ID of the uplink tunnel of the CGW to the AN as an endpoint of the uplink tunnel of the AN and notify the IP address and tunnel ID of the downlink tunnel of the AN to the CGW as an endpoint of the downlink tunnel of the CGW.

Thus it can be seen that, with adoption of the solution, whether to adjust the type of the path between the terminal device and the first forwarding plane may be determined at least based on an AN corresponding to the location of the terminal device. Specifically, the type of the path may include the first-type path for direct connection to the first forwarding path and the second-type path for connection to the first forwarding path through the second forwarding path. Therefore, flexibility and high efficiency of a network architecture may be achieved, gateway processing is implemented with a smallest number of hops in case of no local shunting, and edge network data may be accessed without relatively more configuration changes made on a terminal device side.

A connection management device in an embodiment of the disclosure includes a processor and a memory configured to store a computer program capable of running on the processor.

Herein, the processor is configured to run the computer program to execute the operations of the method in a first or second embodiment. No more elaborations will be made herein.

An embodiment of the disclosure provides a computer storage medium, which stores a computer-executable instruction, the computer-executable instruction being executed to implement the operations of the method in a first or second embodiment.

It is to be noted that terms "include" and "contain" in the disclosure or any other variant thereof is intended to cover nonexclusive inclusions, so that a process, method, object or device including a series of elements not only includes those elements but also includes other elements which are not clearly listed or further includes elements intrinsic to the process, the method, the object or the device. Under the condition of no more limitations, an element defined by the statement "including a/an . . . " does not exclude existence of the same other elements in a process, method, object or device including the element.

The sequence numbers of the embodiments of the disclosure are adopted not to represent superiority-inferiority of the embodiments but only for description.

From the above descriptions about the implementation modes, those skilled in the art may clearly know that the method of the abovementioned embodiments may be implemented in a manner of combining software and a necessary universal hardware platform, and of course, may also be implemented through hardware, but the former is a preferred implementation mode under many circumstances. Based on such an understanding, the technical solutions of the disclosure substantially or parts making contributions to the conventional art may be embodied in form of software product, and the computer software product is stored in a storage medium (for example, a Read-Only Memory (ROM)/Random Access Memory (RAM), a magnetic disk and an optical disk), including a plurality of instructions configured to enable a computer device (which may be a personal computer, a server, an air conditioner, a network device or the like) to execute the method in each embodiment of the disclosure.

The above is only the preferred embodiment of the disclosure and not thus intended to limit the patent scope of the disclosure. Any equivalent structure or equivalent flow transformations made by use of the contents of the specification and drawings of the disclosure or direct or indirect application to other related technical fields shall also fall within the patent protection scope of the disclosure.

The invention claimed is:

1. A connection management method, comprising:
 detecting relevant information of a terminal device; and
 determining whether to adjust a type of a connection path between the terminal device and a first forwarding plane based on the relevant information of the terminal device,
 wherein the connection path between the terminal device and the first forwarding plane comprises: a first-type path which is a connection path directly established with the first forwarding plane by the terminal device through an Access Network (AN); and a second-type path which is a connection path established with the first forwarding plane by the terminal device through another AN via a second forwarding plane,
 wherein before determining whether to adjust the type of the connection path between the terminal device and the first forwarding plane based on the relevant information of the terminal device, the method further comprises: establishing, by the terminal device, a connection with the first forwarding plane through the first-type path at a location where the terminal device is currently located, and
 wherein determining whether to adjust the type of the connection path between the terminal device and the first forwarding plane based on the relevant information of the terminal device comprises:
 when there is the second forwarding plane or a second forwarding plane suitable for the terminal device to access at the location where the terminal device is currently located and it is detected that a present type of service corresponding to the terminal device is switched from a first type of service to a second type of service, determining to adjust the connection path between the terminal device and the first forwarding plane from the first-type path to the second-type path, wherein the first type of service is different from the second type of service, the second type of service is a type of service requiring local service shunting and the first type of service is a type of service not requiring local service shunting.

2. The method of claim 1, wherein the relevant information of the terminal device comprises at least one of a location of the terminal device or a present type of service of the terminal device.

3. The method of claim 2, further comprising:
responsive to determining that the path between the terminal device and the first forwarding plane is required to be adjusted from the first-type path to the second-type path, selecting a corresponding second forwarding plane for the terminal device, sending identification information of the second forwarding plane to the first forwarding plane as information of a downlink tunnel of the first forwarding plane and sending the identification information of the second forwarding plane to a side of the AN as information of an uplink tunnel of the side of the AN, so as to establish the second-type path between the terminal device and the first forwarding plane through the second forwarding plane; and
responsive to determining that the path between the terminal device and the first forwarding plane is required to be adjust from the second-type path to the first-type path, notifying identification information corresponding to the AN to the first forwarding plane and notifying identification information of the first forwarding plane to the AN, so as to establish the first-type path between the terminal device and the first forwarding plane.

4. The method of claim 1, further comprising: before detecting the relevant information of the terminal device,
establishing, by the terminal device, the first-type path with the first forwarding plane through a first access device, coverage corresponding to the first access device not comprising the second forwarding plane or being unsuitable for access to the second forwarding plane,
wherein determining whether to adjust the type of the connection path between the terminal device and the first forwarding plane based on the relevant information of the terminal device comprises:
when a location where the terminal device is currently located enables the second forwarding plane to be accessed or a second forwarding plane suitable for the terminal device to be accessed, determining to adjust the path between the terminal device and the first forwarding plane from the first-type path to the second-type path.

5. The method of claim 4, further comprising:
after the connection path between the terminal device and the first forwarding plane is adjusted from the first-type path to the second-type path, detecting a duration from a moment when the terminal device stops information interaction of the second type of service after completing information interaction of the second type of service for the last time till a present moment; and
when the duration exceeds a preset duration threshold, determining to adjust the connection path between the terminal device and the first forwarding plane from the second-type path to the first-type path.

6. The method of claim 1, further comprising: before detecting the relevant information of the terminal device,
establishing, by the terminal device, the second-type path with the first forwarding plane through a second access device via the second forwarding plane, there being the second forwarding plane or a second forwarding plane suitable for the terminal device to access at a location of the second access device,
wherein determining whether to adjust the type of the connection path between the terminal device and the first forwarding plane based on the relevant information of the terminal device comprises:

when there is no second forwarding plane or no second forwarding plane suitable for the terminal device to access at a location where the terminal device is currently located, determining to adjust the path between the terminal device and the first forwarding plane from the second-type path to the first-type path.

7. The method of claim 1, further comprising: before detecting the relevant information of the terminal device,
establishing, by the terminal device, the second-type path with the first forwarding plane through a second access device via the second forwarding plane,
wherein determining whether to adjust the type of the connection path between the terminal device and the first forwarding plane based on the relevant information of the terminal device comprises:
when a location where the terminal device is currently located does not enable the second forwarding plane to be accessed, determining to adjust the path between the terminal device and the first forwarding plane from the second-type path to the first-type path.

8. The method of claim 1, wherein determining whether to adjust the type of the connection path between the terminal device and the first forwarding plane based on the relevant information of the terminal device comprises:
when a present type of service corresponding to the terminal device is switched from a first type of service to a second type of service, determining to adjust a connection path between the terminal device and the first forwarding plane from the first-type path to the second-type path,
wherein the first type of service is different from the second type of service, the second type of service is a type of service requiring local service shunting, and the first type of service is a type of service not requiring local service shunting.

9. A connection management device, comprising:
a communication interface configured to detect relevant information of a terminal device; and
a processor configured to determine whether to adjust a type of a connection path between the terminal device and a first forwarding plane based on the relevant information of the terminal device,
wherein the connection path between the terminal device and the first forwarding plane at least comprises: a first-type path which is a connection path directly established with the first forwarding plane by the terminal device through an Access Network (AN); and a second-type path which is a connection path established with the first forwarding plane by the terminal device through another AN via a second forwarding plane,
wherein the processor is further configured to:
determine that the terminal device establishes a connection with the first forwarding plane through thr first-type path at a location where the terminal device is currently located; and
when there is the second forwarding plane or the second forwarding plane suitable for the terminal device to access at a location where the terminal device is currently located and it is detected that a present type of service corresponding to the terminal device is switched from the first type of service to the second type of service, determine to adjust the connection path between the terminal device and the first forwarding plane from the first-type path to the second-type path,
wherein the first type of service is different from the second type of service, the second type of service is a type of service requiring local service shunting and the first type of service is a type of service not requiring local service shunting.

10. The connection management device of claim 9, wherein the relevant information of the terminal device comprises at least one of a location of the terminal device or a present type of service of the terminal device.

11. The connection management device of claim 9, wherein the processor is configured to:
determine that the terminal device establishes the first-type path with the first forwarding plane through a first access device, coverage corresponding to the first access device not comprising the second forwarding plane or being unsuitable for access to the second forwarding plane; and
when a location where the terminal device is currently located enables the second forwarding plane to be accessed or a second forwarding plane suitable for the terminal device to be accessed, determine to adjust the path between the terminal device and the first forwarding plane from the first-type path to the second-type path.

12. The connection management device of claim 11, wherein the processor is configured to, after the connection path with the first forwarding plane is adjusted from the first-type path to the second-type path, detect a duration from a moment when the terminal device stops information interaction of the second type of service after completing information interaction of the second type of service for the last time till a present moment, and when the duration exceeds a preset duration threshold, determine to adjust the connection path between the terminal device and the first forwarding plane from the second-type path to the first-type path.

13. The connection management device of claim 11, wherein the processor is configured to:
responsive to determining that the path between the terminal device and the first forwarding plane is required to be adjusted from the first-type path to the second-type path, select a corresponding second forwarding plane for the terminal device, send identification information of the second forwarding plane to the first forwarding plane as information of a downlink tunnel of the first forwarding plane and send the identification information of the second forwarding plane to a side of the AN as information of an uplink tunnel of the side of the AN, so as to establish the second-type path between the terminal device and the first forwarding plane through the second forwarding plane; and
responsive to determining that the path between the terminal device and the first forwarding plane is required to be adjust from the second-type path to the first-type path, notify identification information corresponding to the AN to the first forwarding plane and notify identification information of the first forwarding plane to the AN, so as to establish the first-type path between the terminal device and the first forwarding plane.

14. The connection management device of claim 9, wherein the processor is configured to:
determine that the terminal device establishes the second-type path with the first forwarding plane through a second access device, there being no second forwarding plane or second forwarding plane suitable for the terminal device to access at a location of the second access device; and
when there is no second forwarding plane or no second forwarding plane suitable for the terminal device to access at a location where the terminal device is currently located, determine to adjust the path between the terminal device and the first forwarding plane from the second-type path to the first-type path.

15. The connection management device of claim 9, wherein the processor is configured to:
determine that the terminal device establishes the second-type path with the first forwarding plane through the second access device via the second forwarding plane; and
when a location where the terminal device is currently located does not enable the second forwarding plane to be accessed, determine to adjust the path between the terminal device and the first forwarding plane from the second-type path to the first-type path.

16. The connection management device of claim 9, wherein
the processor is configured to, when the type of service corresponding to the terminal device is switched from a first type of service to a second type of service, determine to adjust a connection path between the terminal device and the first forwarding plane from a first-type path to a second-type path,
wherein the first type of service is different from the second type of service, the second type of service is a type of service requiring local service shunting, and the first type of service is a type of service not requiring local service shunting.

17. A non-transitory computer storage medium having stored thereon computer-executable instructions that, when executed, implement the steps of a connection management method, the method comprising:
detecting relevant information of a terminal device; and
determining whether to adjust a type of a connection path between the terminal device and a first forwarding plane based on the relevant information of the terminal device,
wherein the connection path between the terminal device and the first forwarding plane comprises: a first-type path which is a connection path directly established with the first forwarding plane by the terminal device through an Access Network (AN); and a second-type path which is a connection path established with the first forwarding plane by the terminal device through another AN via a second forwarding plane,
wherein before determining whether to adjust the type of the connection path between the terminal device and the first forwarding plane based on the relevant information of the terminal device, the method further comprises: establishing, by the terminal device, a connection with the first forwarding plane through the first-type path at a location where the terminal device is currently located, and
wherein determining whether to adjust the type of the connection path between the terminal device and the first forwarding plane based on the relevant information of the terminal device comprises:
when there is the second forwarding plane or a second forwarding plane suitable for the terminal device to access at the location where the terminal device is currently located and it is detected that a present type of service corresponding to the terminal device is switched from a first type of service to a second type of service, determining to adjust the connection pathe between the terminal device and the first forwarding plane from the first-type path to the second-type path, wherein the first type of service is different from the second type of service, the second type of service is a type of service requiring local service shunting and the first type of service is a type of service not requiring local service shunting.

18. The non-transitory computer storage medium of claim 17, wherein the relevant information of the terminal device comprises at least one of a location of the terminal device or a present type of service of the terminal device.

\* \* \* \* \*